United States Patent [19]

AvGavaar

[11] Patent Number: 4,465,477
[45] Date of Patent: Aug. 14, 1984

[54] TYPEWRITER INSTRUCTION DEVICE

[76] Inventor: Jairus AvGavaar, 105 Solano Ave., La Selva Beach, Calif. 95076

[21] Appl. No.: 520,143

[22] Filed: Aug. 4, 1983

[51] Int. Cl.³ ............................................. G09B 13/00
[52] U.S. Cl. .................................................. 434/233
[58] Field of Search .............. 434/233, 227, 228, 229, 434/230, 231, 232

[56] References Cited

U.S. PATENT DOCUMENTS

| | | | |
|---|---|---|---|
| 3,080,661 | 3/1963 | Conrath | 434/228 |
| 3,166,856 | 1/1965 | Uttal | 434/229 |
| 3,277,587 | 10/1966 | Holcombe | 434/233 |
| 3,894,346 | 7/1975 | Ward et al. | 434/228 |
| 4,055,905 | 11/1977 | Budrose | 434/229 |
| 4,378,217 | 3/1983 | Wilson et al. | 434/228 |

FOREIGN PATENT DOCUMENTS 2263332 6/1974 Fed. Rep. of Germany ...... 434/233

Primary Examiner—William H. Grieb

[57] ABSTRACT

A typewriter instruction device is provided wherein the student has small ferromagnetic tips at the ends of his fingers while the typewriter keys have electromagnets which attract the student's correct finger when an instruction to type a certain key is given. In accordance with a preferred embodiment of the invention, permanent magnets are employed at the fingertips with alternating polarities on adjacent fingertips, while the electromagnets have reversed alternating polarities, so that the correct finger is not only attracted to the proper key but adjacent fingers are actually repelled.

5 Claims, 4 Drawing Figures

TYPEWRITER INSTRUCTION DEVICE

SUMMARY OF THE INVENTION

The present invention relates to a device for teaching typing wherein the student is provided with a series of ferromagnetic fingertips and with corresponding electromagnets under each of the keys. The student is given a command, either visually or audibly, to type a certain letter and simultaneously the proper electromagnet is energized and thus the student's finger is attracted to that particular key.

In a preferred embodiment of the invention, permanet magnets are employed on the fingertips while the electromagnets are energized by direct current of the correct polarity so that a student's correct finger is not only attracted, but adjacent fingers are actually repelled from that key.

At the present time, students are ordinarily instructed in typing by learning the positions of the fingers and then pressing down on the proper finger when a certain command is given. This involves the mental steps of receiving the command, converting this command from one's memory and to the proper key and finger and then pressing upon the proper key. The system of the present invention short circuits these mental steps since the student is commanded to type a certain letter and the proper finger is immediately drawn to the proper key so that the response becomes entirely automatic. By avoiding the intermediate mental steps, the student learns much faster.

Another advantage of the present invention is that one can learn typing without the necessity of an instructor since the whole program is easily set up on a computer.

Since the teaching now becomes almost a mechanical response, children can learn to type at a much earlier age as well as learning how to spell and write.

Another feature is that a signal is produced when the correct key is struck which can activate the signal for the next letter so that the program adapts itself to the response speed of the student.

Other objects and features of the invention will be brought out in the balance of the application.

DESCRIPTION OF THE PREFERRED EMBODIMENTS

Figure 1:
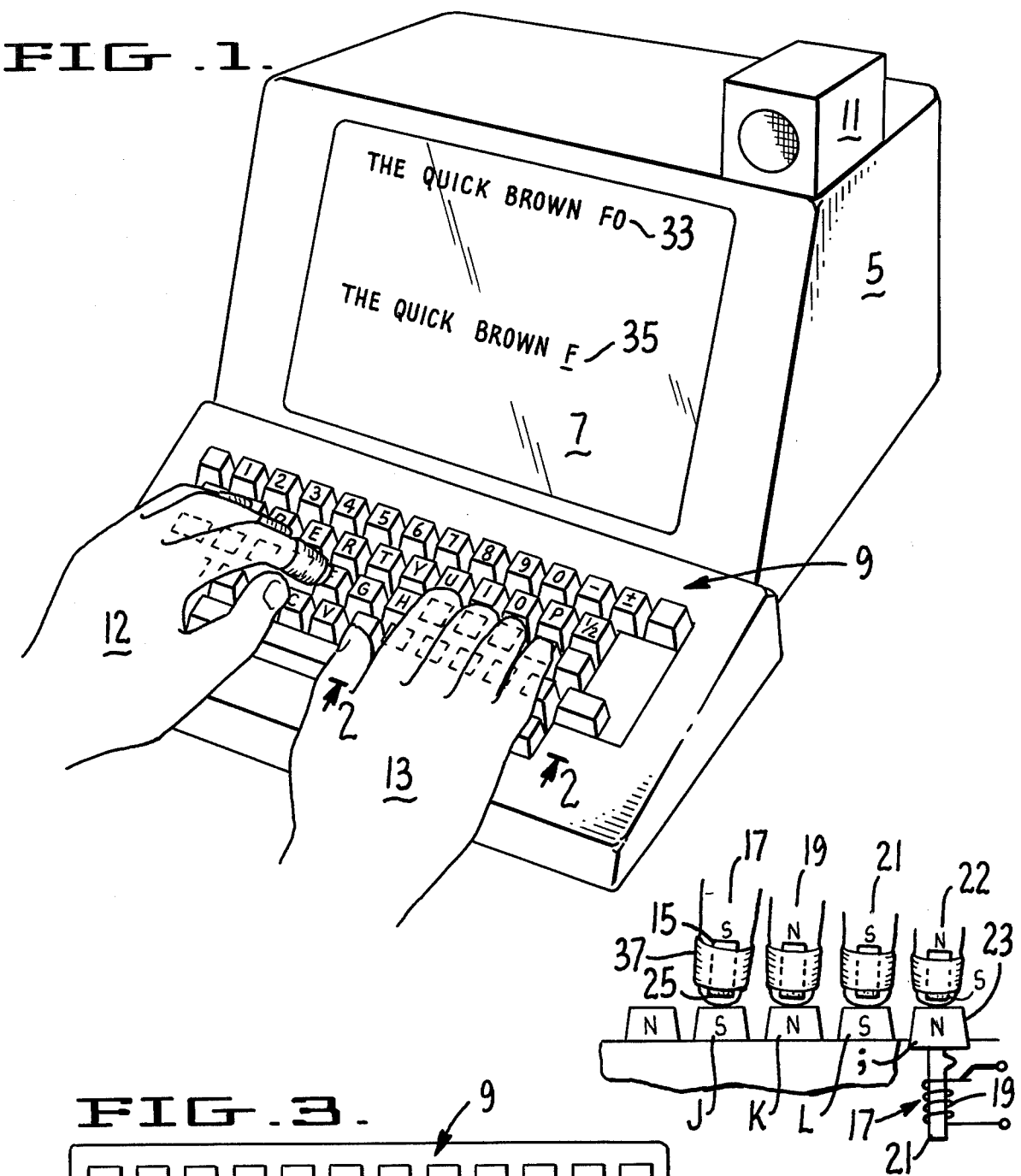
FIG. 1 is a perspective view of a device embodying the present invention, showing a student in the process of typing.

The drawings forming a part of this application show an embodiment of the invention in the form of a computer terminal, although it will be obvious from the balance of the specification that this is for illustration purposes only and that practical embodiments of the invention can take many forms.

In the drawings, a computer terminal 5 is shown having the usual CRT readout 7 and keyboard 9. In addition, a loudspeaker 11 can also be provided.

In the drawings, a student's hands 12 and 13 are shown resting in what is normally called the "home" position, namely with the left hand 12 on the letters A,S,D,F and the right hand 13 with the fingers 17, 19, 21 and 22 on the characters J,K,L,;.

Each of the student's fingertips is provided with a small piece of a ferromagnetic material 15. In case of the broadest aspects of the invention, the ferromagnetic material may be a soft magnetic material which would be attracted to a magnet of either north or south polarity. Under each of the keys is an electromagnet designated 17 which consists of a solenoid 19 and a soft ferromagnetic core 21. This is placed under a key such as 23 which can either be of plastic or which can actually form part of the core 21. In any event, means are provided in the computer for energizing the electromagnet under the appropriate key when a command has been given to type a certain letter.

Although it is completely feasible to employ soft ferromagnetic materials on the fingertips, it is preferred that a hard permanent magnet material be employed with alternating fingers having alternating north and south polarities and with the electromagnet being energized by current of the proper polarity to produce an attracting effect on the correct key. For instance, in the left hand "home" position where the fingers rest on A,S,D,F, respectively, the fingers (counting from the pinkie) might be provided with permanent magnets having extremities of N,S,N,S polarities while the electromagnets, again counting from the left, would be adapted to be energized to the opposite polarity, namely S,N,S,N. The same condition would also apply with respect to keys immediately above and below. Obviously the polarities could all be reversed with the same result.

Figure 2:
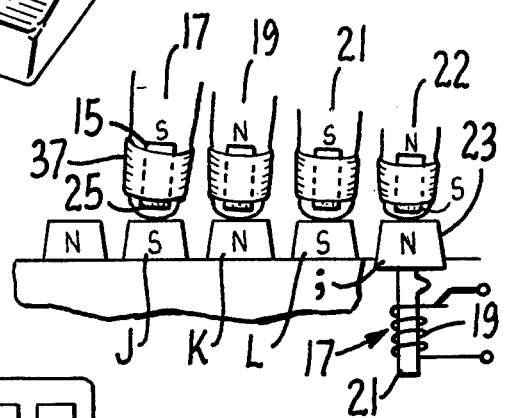
FIG. 2 is an enlarged section on the line 2—2 of FIG. 1.
Figure 3:
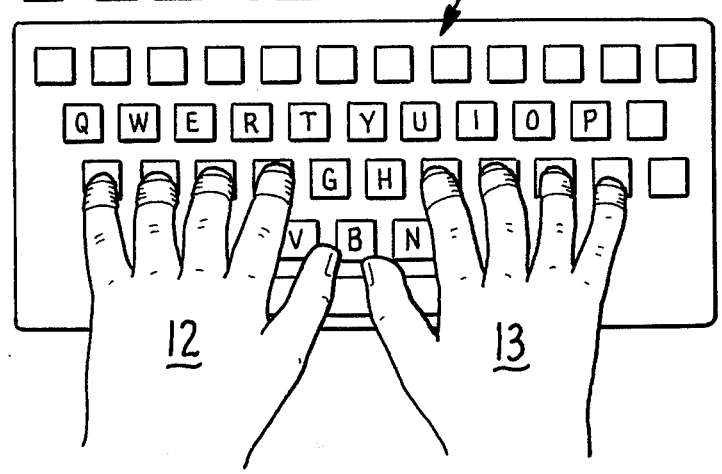
FIG. 3 is a plan view of a typical keyboard showing a student's hands in place.

This is illustrated in FIG. 2 showing the fingers of the right hand designated 17, 19, 21 and 22 which rest on the home keys of the right hand which are shown in the drawings as J,K,L and ;. Thus, in this embodiment of the invention finger 17 has a tip 25 of north polarity, while the electromagnet of the letter "J" is adapted to be energized to the south polarity so that the finger 17 will be attracted to the "J" key. Also, finger 19 which has the opposite polarity tip will actually be repelled from this key.

Figure 4:
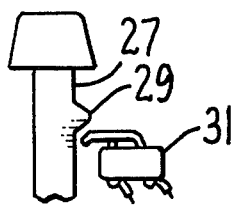
FIG. 4 is an enlarged view of a typical key having a switch incorporated thereon to signal that the proper key has been pressed.

The device of the present invention is provided with means to shut off the magnetic force when the proper key has been struck and which will also serve to advance the indicator to the next letter which the student is to type. One means of accomplishing this is shown in FIG. 4 wherein the key 27 is provided with a projection 29 adapted to contact the small switch 31. Thus, as the key 27 is depressed, assuming it is the correct key, switch 31 will be activated, shutting off current to the electromagnet and indicating that the student should be instructed to press the next letter of the text. This electromechanical arrangement is shown primarily for the purpose of illustration and ordinarily this result would be achieved in the software of the computer. Of course, if it is desired to "push" the student to a higher than comfortable speed, this feature would not be used.

In this embodiment of the invention, two lines, namely 33 and 35, are shown displayed on the face of the CRT. In line 33, the instructions are given to the student and line 35 shows what the student has actually typed. At the moment, the student has just typed the "F" in line 35 and the computer has indicated that the next letter should be "O" as is shown at the end of line 33.

In some instances, particularly with blind students, the instruction would be audible rather than visual in which case the computer 5 would activate loudspeaker 11 to indicate to the student the next letter to be typed. Of course, the instruction could be both audible and visual.

In the illustrations, the student is shown at a computer terminal. Obviously, the same method could be adapted to an ordinary mechanical or electrical typewriter wherein the student types on paper rather than merely seeing an indication on the CRT. Also, other methods might be used to instruct a student as to the next desired key. One might even have a system employing an instructor wherein the instructor would have a keyboard adapted to energize the student's keyboard and would merely call out the letter that the instructor was typing which would energize the electromagnet from the corresponding character of the student's machine.

Various means can be used to hold the ferromagnetic material to the fingertips of a student. In the drawings, a band 37 is employed which might be of ordinary adhesive tape. Similar results could be obtained utilizing gloves, fingercots, adhesives or the like.

Many variations can be made in the structure shown and described without departing from the spirit of this invention.

I claim:
1. A machine for teaching typing comprising in combination:
 (a) a keyboard of the usual typewriter configuration with alphanumeric keys,
 (b) an electromagnet associated with each of said keys,
 (c) means for maintaining pieces of a ferromagnetic material on the tips of the fingers of a student to be instructed,
 (d) means for indicating to the student which key is to be struck,
 (e) means for simultaneously energizing the corresponding electromagnet of the key which has been indicated, whereby
 (f) the student's finger will be attracted to the correct key.
2. The machine of claim 1 having audible indicating means.
3. The machine of claim 1 having visual indicating means.
4. The machine of claim 1 wherein the electromagnets of adjacent keys are of opposite polarity and the student is provided with permanent magnets on each finger with the polarity reversed on alternating fingers and having the polarity of the permanent and electromagnets in attracting relationship on the correct key.
5. The machine of claim 1 wherein means are provided to deactivate each electromagnet when the proper key is pressed and thereby trigger the indication for the next character.

* * * * *